United States Patent Office 2,756,219
Patented July 24, 1956

2,756,219

RELATIVELY HOMOGENEOUS LOW MOLECULAR WEIGHT COPOLYMERS, THEIR PREPARATION AND COMPOSITIONS CONTAINING THE SAME

Franciscus Johannes Fredericus van der Plas and Christiaan Pieter van Dijk, Amsterdam, Netherlands, assignors to Shell Development Company, Emeryville, Calif., a corporation of Delaware No Drawing. Application August 31, 1951, Serial No. 244,736

Claims priority, application Netherlands September 6, 1950

14 Claims. (Cl. 260—32.2)

This invention relates to a new class of copolymers and to their preparation. More particularly, the invention relates to a new class of low molecular weight copolymers having a relatively homogeneous composition to a method for preparing the copolymers, and to their utilization, particularly as plasticizers for thermoplastic resinous materials.

Specifically, the invention provides new and particularly valuable polymeric material having improved plasticizing properties comprising low molecular weight relatively homogeneous copolymers of unsaturated esters of carboxylic acids wherein the said esters contain a plurality of ester groups only one of which contains a polymerizable linkage, and dissimilar ethylenically unsaturated organic compounds described hereinafter, which copolymers are prepared by copolymerizing the desired unsaturated ester and the dissimilar monomer under such conditions that the resulting copolymer has a molecular weight below about 3000, and preferably in the presence of certain chain transfer agents, and during the copolymerization maintaining the concentrations of the said unsaturated ester and dissimilar monomer in the reaction mixture within certain narrow limits. The invention also provides improved thermoplastic vinyl polymers plasticized with the aforedescribed low molecular weight copolymers.

As a preferred embodiment, the invention provides a special group of low molecular weight relatively homogeneous copolymers prepared by copolymerizing the unsaturated esters described above with a member of the group consisting of alkenes, and preferably those containing at least four carbon atoms, halogenated alkenes and —CH$_2$=C< substituted aromatic compounds, according to the aforedescribed process wherein the molecular weight of the resulting copolymer is below 3000 and preferably between 300 and 1000, and the ratio of the concentrations of monomers in the reaction mixture during the copolymerization is maintained within such limits that in practically any interval of time the copolymer formed within such interval contains an average of 5 to 14 carbon atoms per ester group, and in case a —CH$_2$=C< substituted aromatic compound is employed, an average of 1.8 to 2.5 ester groups for every aromatic nucleus. The expression "ester group" as used herein and in the appended claims refers to the

group.

Vinyl-type polymers, and particularly the vinyl halide polymers, are generally quite brittle and difficult to mill and mold. To overcome these difficulties, it has been common practice to mix the polymers with a plasticizing material, such as dioctyl phthalate, dibutyl phthalate and tricresyl phosphate. While these materials are satisfactory in that they generally improve the processability and flexibility of the resulting composition, they still leave much to be desired as general all around satisfactory plasticizing agents. Many of the materials, for example, are quite volatile and are readily lost from the plasticized composition after a short period of exposure. Compositions containing the conventional plasticizers also generally have rather poor low temperature flexibility. Still other of the conventional plasticizers have rather poor resistance to water and alkali. Still other plasticizers have poor stability in the presence of the polymer compositions and are easily decomposed in the presence of heat and/or light.

Attempts have been made in the past to correct some of these defects by employing high molecular weight materials as the plasticizing agent but the results obtained heretofore with these materials have not been too satisfactory. Most of the high molecular weight materials suggested are incompatible with the vinyl-type polymers at the loadings necessary to obtain the desired improvement in flexibility, etc. This is particularly true when the material is added to the vinyl halide polymers as these polymers generally have very poor solubility characteristics. Many of the suggested high molecular weight plasticizers not only fail to show any improvement in the low temperature properties but actually cause a great loss of flexibility at the low temperatures. A great many of the high molecular weight materials suggested also have poor stability in combination with the vinyl-type polymers and the composition becomes discolored when exposed to relatively high temperatures.

It is, therefore, an object of the invention to provide a new class of plasticizers for organic resinous materials. It is a further object to provide normally liquid relatively homogeneous low molecular weight copolymers having improved properties as plasticizers. It is a further object to provide a process for preparing relatively low molecular weight relatively homogeneous copolymers of certain unsaturated esters having unobvious properties. It is a further object to provide plasticized thermoplastic resinous compositions having improved properties. Other objects and advantages of the invention will be apparent from the following detailed description thereof.

It has now been discovered that these and other objects may be accomplished by the novel copolymers of the invention comprising the low molecular weight relatively homogeneous copolymers of unsaturated esters of carboxylic acids wherein the said esters contain a plurality of ester groups only one of which contains a polymerizable linkage, and dissimilar ethylenically unsaturated organic compounds, which copolymers are prepared by copolymerizing the desired unsaturated ester and the dissimilar monomer under such conditions that the resulting copolymer has a molecular weight below about 3000, and preferably in the presence of certain chain transfer agents, and during the copolymerization maintaining the concentrations of the said unsaturated ester and dissimilar monomer in the reaction mixture within certain narrow limits. Coming under special consideration are the liquid low molecular weight copolymers prepared by copolymerizing one of the aforedescribed unsaturated esters possessing a plurality of ester groups with a dissimilar monomer of the group consisting of alkenes and preferably those containing at least 4 carbon atoms, halogenated alkenes and —CH$_2$=C< substituted aromatic compounds, under such conditions that the molecular weight of the resulting copolymer is below about 3000, and preferably between 300 and 1000, and maintaining the ratio of the concentrations of the unsaturated ester and dissimilar monomer in the reaction mixture during copolymerization within such limits that in practically any interval of time the copolymer formed within such interval contains an average of 5 to 14 carbon atoms per ester group, and in case a —CH$_2$=C< substituted aromatic compound is employed, an average of 1.8 to 2.5 ester groups for every aromatic nucleus.

The copolymers of the invention are distinguished from the usual copolymers in that they are normally liquid, have a very low molecular weight and have a relatively homogeneous composition, i. e., the macromolecules wherein the monomer units are united in ratios which vary only within certain narrow limits are met with more often than macromolecules wherein the monomer units are united in other ratios. Preferably at least 60% to 80% of the macromolecules have the monomer units united in ratios which vary only within narrow limits. The prior known polymers on the other hand have relatively high molecular weight and non-homogeneous compositions, i. e., the individual macromolecules contain the dissimilar monomers in a wide variety of proportions, such as, for example, from 1:9 to 9:1. In addition, the preferred copolymers prepared in the presence of the chain transfer agents have a part, and preferably at least 10%, of the macromolecules making up the copolymer chemically bound to individual molecules of the hereinafter described chain transfer agents.

It has been found that the above-noted distinguishing features endow the novel copolymers of the invention with many unique and unobvious properties, particularly as to their ability to be used as plasticizers for thermoplastic vinyl polymers. The novel copolymers of the invention have been found to be compatible with the vinyl polymers over a wide range of loadings and the resulting compositions are easily milled and molded. The finished plasticized compositions containing the novel copolymers have good strength and flexibility and improved resistance to water and alkali. In addition, the novel copolymers have substantially zero volatility and the plasticized polymer compositions containing them are able to withstand long periods of exposure to high temperatures without shrinking or becoming embrittled. The above-described special group of low molecular weight copolymers, and particularly those prepared from the alkenes containing at least four carbon atoms, are especially valuable as plasticizers.

Of special interest are plasticizers are the aforedescribed copolymers prepared in the presence of the chain transfer agents. Compositions containing these copolymers have greatly improved flexibility, particularly at the lower freezing temperatures where the usual plasticized compositions become quite brittle. The compositions containing these particular copolymers also have superior stability and can withstand long periods of exposure to heat and light without becoming discolored.

The unsaturated esters used in preparing the novel copolymers comprise the unsaturated esters of carboxylic acids wherein the said esters containing a plurality of ester groups, and preferably from 2 to 4 ester groups, only one of which contains a polymerizable linkage. The acids employed in the preparation of these monomers may be aliphatic, cycloaliphatic, aromatic or heterocyclic and may be monocarboxylic or polycarboxylic acids. If the acids are monocarboxylic, they must possess additional ester groups attached to the acid molecule, e. g., they may be hydroxy-substituted monocarboxylic acids wherein the hydroxyl group is subsequently esterified with a carboxylic acid. If the acid is a polycarboxylic acid it may contain 2, 3, 4 or more carboxyl groups at least two of which will be esterified. Examples of the acids that may be used in producing the unsaturated esters are glycolic acid, alpha-hydroxybutyric acid, lactic acid, alpha-hydroxylvaleric acid, mandelic acid, atrolatic acid, alpha-hydroxylauric acid, alpha-hydroxycaprylic acid, o-hydroxybenzoic acid, hydracrylic acid, gamma-hydroxybutyric acid, 6-hydroxycaproic acid, alpha-hydroxydecanoic acid, oxalic acid, malonic acid, succinic acid, glutaric acid, adipic acid, pimelic acid, suberic acid, azelaic acid, phthalic acid, isophthalic acid, terephthalic acid, trimellitic acid, trimesic acid, 1,1,5-pentanetricarboxylic acid, 1,2,4,6-decanetetracarboxylic acid, 1,2,4-hexanetricarboxylic acid, 3,3,6-octanetricarboxylic acid, and 1,2,3-propanetricarboxylic acid.

Preferred acids to be used in producing the unsaturated esters comprise the dicarboxylic acids containing from 2 to 18 carbon atoms, and the hydroxy-substituted monocarboxylic acids containing from 2 to 15 carbon atoms, such as glycolic acid, alpha-hydroxyvaleric acid, mandelic acid, atrolatic acid, alpha,beta-dihydroxyvaleric acid, alpha-hydroxyisovaleric acid, hydracrylic acid, gamma-hydroxyvaleric acid, malonic acid, succinic acid, pimelic acid, and the like.

Particularly preferred acids are the saturated aliphatic dicarboxylic acids containing from 2 to 12 carbon atoms and the hydroxy-substituted saturated aliphatic monocarboxylic acids containing from 2 to 12 carbon atoms. Coming under special consideration are the alkanedioic acids containing from 2 to 10 carbon atoms, and the monohydroxy-substituted alkanoic acids containing from 2 to 8 carbon atoms.

The unsaturated esters are prepared from the above-described acids by esterifying one of the carboxyl groups with an unsaturated alcohol. Alcohols that may be used for this purpose include the monohydric aliphatic, cycloaliphatic and aromatic alcohols possessing an ethylenic linkage, preferably not more than four carbon atoms removed from the terminal hydroxyl group. Such alcohols may be exemplified by allyl 3-buten-1-ol, 4-chloro-3-buten-1-ol, 4-hexen-1-ol, 5-cyclohexyl-3-hexen-1-ol, and the like. A preferred group of the unsaturated monohydric alcohols comprises the beta,gamma-ethylenically unsaturated alcohols, sometimes referred to as allyl-type alcohols. They may be exemplified by allyl alcohol, crotyl alcohol, tiglyl alcohol, 3-chloro-2-buten-1-ol, cinnamyl alcohol, 2,4-hexadien-1-ol, 2-methyl-2-hexen-1-ol, 5-chloro-2-octen-1-ol, 4-phenyl-2-hepten-1-ol, and 3-ethyl-2-octen-1-ol. Another preferred group comprises the alpha,beta-ethylenically unsaturated alcohols, sometimes referred to as vinyl-type alcohols. Many of these alcohols have never been isolated and require special methods known to the art for their preparation. They may be exemplified by vinyl alcohol, 1-isopropen-1-ol, 1-hexen-1-ol, 1-buten-1-ol, 3-chloro-1-buten-1-ol, 3-bromo-1-hexen-1-ol, and the like.

Particularly preferred unsaturated alcohols to be used in preparing the esters are the beta-gamma-ethylenically unsaturated aliphatic monohydric alcohols containing from 3 to 18 carbon atoms, and the alpha-beta-ethylenically unsaturated aliphatic monohydric alcohols containing from 2 to 15 carbon atoms. Of special interest are the 2-alken-1-ols containing from 3 to 12 carbon atoms and the 1-alken-1-ols containing from 2 to 12 carbon atoms.

If the acid selected is a polycarboxylic acid, only one of the carboxyl groups will be esterified with the above-described unsaturated alcohols and the remaining carboxyl group or groups will be esterified with a saturated monohydric alcohol, such as methanol, ethanol, butanol, hexanol, decyl alcohol, cyclohexanol, dimethylcyclopentanol, benzyl alcohol, and the like. Preferred saturated alcohols to be used for this purpose are the aliphatic monohydric alcohols containing from 1 to 10 carbon atoms, and more preferably the alkanols containing from 1 to 8 carbon atoms.

If the acid selected is a hydroxy-substituted monocarboxylic acid, the hydroxyl group may be esterified with a saturated monocarboxylic acid, and preferably an aliphatic saturated monocarboxylic acid containing from 1 to 15 carbon atoms, such as acetic acid, butyric acid, propionic acid, hexanoic acid, chloroacetic acid, octanoic acid, and the like. Preferred acids to be used for this purpose are the alkanoic acids containing from 1 to 8 carbon atoms.

The unsaturated esters prepared from the above-described acids and alcohols may be exemplified by allyl ethyl oxalate, vinyl butyl oxalate, methallyl butyl malonate, vinyl isoamyl succinate, chloroallyl ethyl pimelate, vinyl isoamyl glutarate, allyl methyl phthalate, vinyl methyl phthalate, allyl diethyl 1,1,5-pentanetricarboxylate, 2-hexenyl butyl adipate, 2-heptenyl methyl 1,2,4-pentanetricarboxylate, 2-octenyl methyl oxalate, allyl dipropyl 1,2,3-propanetricarboxylate, allyl acetyl lactate, allyl acetylglycolate, methallyl acetyl lactate, vinyl acetyl mandelate, hexenyl acetylhydroacrylate, chloroallyl acetylatrolate, 2 - hexenyl butyrylglycolate, 2 - octenyl 3 - acetylhexanoate, 3-hexenyl 3-butyrylheptanoate, and the like.

Preferred unsaturated esters are the liquid esters containing only two ester groups in their molecule. One group of these esters consists of the neutral esters of the aliphatic dicarboxylic acids containing from 2 to 12 carbon atoms wherein one of the carboxyl groups is esterified with the saturated monohydric alcohol and the other carboxyl group is esterified with one of the above-described allyl and vinyl-type monohydric alcohols. Examples of such esters include allyl ethyl oxalate, methallyl hexyl succinate, allyl amyl pimeliate, allyl butyl adipate, and the like. Another subgroup of these esters consists of the esters of the hydroxy-substituted aliphatic monocarboxylic acids containing from 2 to 12 carbon atoms wherein the hydroxyl group is esterified with a saturated aliphatic monocarboxylic acid and the carboxyl group is esterified with one of the above-described vinyl and allyl-type monohydric alcohols. Examples of such esters include allyl acetoxyacetate (allyl acetylglycolate), allyl 2-acetoxypropionate (allyl acetyllactate), vinyl acetoxyacetate, methallyl butroxypropionate, 2-heptenyl butyroxypentanoate, allyl 3-acetoxyhexanoate, chloroallyl 3-acetoxydecanoate, and vinyl 3-acetoxyheptanoate.

Particularly preferred esters to be used in preparing the copolymers are the unsaturated esters of the alkanedioic acids containing from 2 to 10 carbon atoms wherein one of the carboxyl groups is esterified with an 2-alkenol containing from 3 to 12 carbon atoms and the other carboxyl group is esterified with an alkanol containing from 1 to 8 carbon atoms, and the unsaturated esters of the hydroxy-substituted alkanoic acids wherein the hydroxy group is esterified with an alkanoic acid containing from 1 to 8 carbon atoms and the carboxyl group is esterified with an 2-alkenol containing from 3 to 12 carbon atoms.

The dissimilar monomers to be copolymerized with the esters are those containing a polymerizable $>C=C<$ group. Particularly, preferred monomers comprise the alkenes, halogenated alkenes and the $-CH_2=C<$ substituted aromatic compounds.

The alkenes to be employed in producing the novel copolymers are the open-chain aliphatic hydrocarbon compounds containing an ethylenic linkage preferably not more than four carbon atoms removed from the end of the chain and preferably containing at least 4 carbon atoms. Such compounds include butene-1, hexene-1, octene-1, octene-3, dodecene-1, tetradecene-3, octadecene-1, decene-3, and the like, and mixtures thereof. Preferred alkenes are those containing from 6 to 14 carbon atoms and more preferably from 6 to 10 carbon atoms and possessing the ethylenic linkage in the number 1 position.

The halogenated alkenes to be used in producing the novel copolymers are those derivatives obtained by replacing at least one of the hydrogen atoms on the molecule of the aforedescribed alkenes with a halogen atom, such as chlorine, bromine and fluorine. Examples of these derivatives include 3-chlorooctene-1, allyl chloride, vinyl chloride, methallyl chloride, 4-bromoheptene-1, 2,5-dichlorodecene-1, and the like.

The $-CH_2=C<$ substituted aromatic compounds to be copolymerized with the unsaturated esters are the aromatic compounds possessing a single $CH_2-C=$ group attached directly to an aromatic nucleus such as styrene, alpha-methylstyrene, chlorostyrene, dichlorostyrene, alpha-butylstyrene, and vinyl naphthalene. Preferred $-CH_2=C<$ substituted aromatic compounds are those containing from 8 to 15 carbon atoms and having a single vinyl group attached to a single benzene nucleus. Also of interest are the halogenated $-CH_2=C<$ substituted aromatic compounds, such as dichlorostyrene.

As indicated above, the novel copolymers are prepared under such conditions that the molecular weight of the resulting product is below about 3000. This feature is very important, particularly if the copolymers are to be used as plasticizers for the thermoplastic resinous materials. Copolymers having average molecular weights in excess of 3000 in general fail to have the desired degree of compatibility and fail to impart the desired degree of improvement in the physical properties of the composition, such as the desired improvement in the low temperature flexibility. Particularly preferred copolymers are those having an average molecular weight between 300 and 1000 and preferably between 400 and 800.

The molecular weights of the polymers disclosed and claimed in this application were determined ebullioscopically in benzene. In this method, the boiling point elevations of five solutions of the sample in benzene of different concentrations were determined with obvious corrections for barometric deviations. The five molecular weights calculated from these boiling point elevations and the known ebullioscopic constant of benzene were then plotted to give the molecular weight at zero concentration. This last molecular weight is the one reported herein in the appropriate case.

Any suitable conditions may be employed in the process to keep the molecular weight of the resulting copolymer at the desired level. Factors which exert an influence on the molecular weight of the copolymer include the method of polymerization (e. g., polymerization in emulsion, suspension, solvent solution or bulk), the concentration of the compounds to be polymerized, the nature and concentration of the catalyst employed, medium and temperature. When the polymerization is accomplished in solution, the molecular weight of the product will be lower when the dilution is stronger, i. e., when the concentration of solvent is greater. The higher the copolymerization temperature the lower will be the molecular weight of the finished copolymer.

The novel copolymers are preferably prepared in the presence of a special group of chain transfer agents. The chain transfer agents to be employed are those capable of furnishing a labile monovalent atom which is capable of terminating a polymerizing free radical, and a new radical which is capable of combining with the aforedescribed polymerizable monomers to prepare a new copolymer chain. The chain transfer agents selected, however, should preferably not possess a grouping, such as an ethylenic linkage, which would enable the agent to undergo polymerization with the monomers other than by the mechanism indicated above, i. e., by combining the free radical formed by removing the monovalent atom with the unsaturated monomer. Compounds suitable for use in the process of the invention include the alcohols, aldehydes, such as valeraldehyde, ketone, such as acetone, methyl ethyl ketone, ethers, such as diethyl ether, halogenated hydrocarbons, such as carbon tetrachloride, halogenated alcohols, aldehydes, ethers and organic acids, such as alphabromopropionic acid and esters or anhydrides of such acids, such as propyl trichloroacetate and chloroacetic acid anhydride, acid halides, such as acetyl chloride and chloro-acetyl chloride, esters of inorganic acids, such as tetraethyl silicate, tributyl phosphate, various nitrogen compounds, such as ammonia, amines, cyanogen and nitro compounds, sulphur halides, such as sulphur monochloride and sulphur dichloride, sulphuryl chloride and benzene sulphonyl chloride, mercaptans, such dodecyl mercaptan, and their related organic sulfur compounds.

A preferred group of chain transfer agents are those described above wherein the labile monovalent atom is a labile hydrogen atom attached to an aliphatic carbon atom, such as the saturated aliphatic ketones, aldehydes, ethers, mercaptans, and alkyl substituted aromatic compounds, and the like.

Especially preferred chain transfer agents to be used, particularly because of the superior plasticizing properties of the copolymers formed in their presence, are the hydrocarbons having a mobile hydrogen atom linked to an aliphatic carbon atom that in turn is linked to an aromatic nucleus. Examples of such compounds include isopropylbenzene (cumene), isobutylbenzene, triphenylmethane, diphenylmethane, and the like.

Also of special interest as chain transfer agents, particularly because of the fine plasticizing properties possessed by the resulting copolymers, are the saturated aliphatic aldehydes and ketones, such as acetone, methyl ethyl ketone, propanal, butanal, octanal, hexanal, acetaldehyde, butyl amyl ketone, and the like. Particularly preferred are the alkanals and dialkyl ketones containing from 2 to 8 carbon atoms.

The amount of the chain transfer agent employed will depend upon the desired molecular weight and the proportion of the macromolecules contained in the copolymer that are to be terminated by the chain transfer agent. The amount of the agent employed should preferably be at least sufficient to produce a substantial quantity, and preferably at least 10% to 20%, of the macromolecules chemically bound to the chain transfer agent. The amount of the agent to accomplish the above-described purpose will vary depending upon the relative activity of the agent, i. e., the activity of the labile monovalent atom, the type of monomer to be polymerized and the conditions to be employed in obtaining the molecular weight. It is apparent that if the labile monovalent atom on the agent is quite active, the amount of the agent can be relatively small, e. g., from 15 parts to 50 parts per 100 parts of monomer. On the other hand, if the agent is not quite so reactive, larger amounts, e. g., from 50 parts to 200 parts may be necessary. In addition, if the monomers themselves possess a labile monovalent atom which is relatively active and at least as active as that atom on the chain transfer agent itself, more of the chain transfer agent should be used to insure that the required amount of agent is incorporated within the structure of the copolymer. In such cases, the amount of agent should preferably be at least 25 parts and more preferably at least 30 parts per 100 parts of monomer.

The amount of the transfer agent will also depend on whether it is to be used as a means for bringing the molecular weight of the copolymers within the desired range. In some cases, the presence of the chain transfer agent itself may be sufficient to bring the molecular weight to the desired level. In such cases, the agents will generally be employed in relatively large quantities, e. g., 25% to 250% by weight of monomer. In other cases, however, it will not be advisable to employ the agent as the sole means for lowering the molecular weight because the amount of the agent required to obtain the low mol. weight will generally be so large as to make it impractical or impossible to operate the process. Generally, other features, such as high temperatures, are also employed and the chain transfer agents act in combination therewith to bring the molecular weight below the desired level.

In general, the amount of the chain transfer agent employed will vary from 10 parts to 250 parts, and more preferably from 25 to 150 parts per 100 parts of monomer.

In order to obtain products having the desired superior properties, it is advisable during the copolymerization to keep the ratio of the concentrations of the monomers and the chain transfer agents substantially constant or within certain narrow limits. This is preferably accomplished by adding the chain transfer agent at about the rate at which it is consumed in the reaction mixture.

The polymerization of the unsaturated ester and the dissimilar monomer is further accomplished under controlled conditions such that the ratio of the concentration of the monomers during copolymerization is maintained substantially at any time and substantially in each part of the reaction mixture within certain limits. This feature insures that the finished copolymer will have a relatively homogeneous composition.

In the case of the above-described special group of copolymers wherein the unsaturated ester is copolymerized with the alkenes, halogenated alkenes and vinyl aromatic compounds, it is preferred to maintain the ratio of the concentrations of the monomers during copolymerization within such limits that in practicaly any interval of time the copolymer formed within such interval contains an average of not less than 5 and not more than 14 carbon atoms per ester group, and more preferably from 5 to 10 carbon atoms per ester group. In case a vinyl aromatic compound is employed, it is preferred to maintain an average of 1.8 to 2.5 ester groups for every aromatic nucleus.

The control of the monomer concentrations is preferably accomplished by bringing the monomers together at the outset in such ratio that the copolymer formed in the beginning has the required average composition and then as the polymerization progresses care is taken to insure that the monomer ratio remains the same or varies only within certain narrow limits. If this latter condition is maintained during the entire course of the polymerization and other factors, such as temperature, do not undergo considerable change, it is certain that a copolymer of the required composition will continue to be formed.

The process is preferably operated so that the ratio between the concentrations of the monomers is kept practically at any time and in any given part of reaction mixture at approximately the same value. This method of operating the process is particularly desirable as under these conditions the properties of the copolymers are strongly accentuated.

The suitability of the copolymers for their specific application, such as plasticizers, is not, however, always nullified if during the copolymerization the ratio of monomer concentrations lies temporarily outside the said ratio limts, provided that the part of the product formed outside the ratio limits is small as compared with the bulk of the product and the deviations on the unfavorable side of the ratio limits are not too great. The permissible quantity of copolymer formed outside the ratio limits is also determined by the composition of the bulk of copolymer formed within the ratio limits. As a rule, the ratio of the monomer concentrations is not allowed to vary more than 20%.

The ratio of monomer concentrations to be employed at the beginning of the process in order to produce the copolymer having the desired composition will vary with the different monomers and the method of copolymerization selected. Such a ratio can be determined for each individual case by various methods. One method comprises conducting a series of routine experiments wherein the monomers are brought together in a variety of proportions under the desired conditions and the first portion of copolymer formed is removed and analyzed.

Any suitable method may be employed to determine when the concentration of the monomers in the reaction mixture has gone outside of the desired limits. One suitable method comprises withdrawing a sample of the copolymerizing mixture, measuring the specific gravity of the sample and ascertaining the amount of copolymer therein from the correlation of copolymer content to specific gravity. Another method comprises determining a measurable physical property of the reaction mixture itself which varies with the proportions of ingredients contained therein.

Various methods may be employed to keep the ratio of the monomer concentrations in the reaction mixture within the desired limits. This may be accomplished, for example, by merely stopping the copolymerization after the ratio of the monomer concentrations has reached the limiting value. This method is of particular importance if the change in the ratio between the monomer concentrations during the copolymerization is slow and a considerable yield of copolymer can be obtained before the limit value in the ratio has been attained.

Another method is to adjust the ratio between the monomer concentrations by adding monomer during the course of the polymerization. In the copolymerization of two monomers it is in most cases sufficient if the monomer which is consumed at the fastest rate is added to the reaction mixture. This addition can occur periodically or continuously. If more than two monomers are involved in the copolymerization, the ratio between the monomer concentrations can be kept within the required limits by the addition of all monomers taking part in the copolymerization with the exception of the monomer which is consumed at the slowest rate during the polymerization. In this paragraph and further on, the rate of consumption of a monomer in the copolymerization is expressed in per cent of the initial concentration of that particular monomer.

To obtain copolymers wherein the greatest part of their macromolecules have the same composition, it is necessary to keep the ratio between the monomer concentrations constant during the copolymerization. This can be accomplished by the addition of all the monomers taking part in the copolymerization with the exception of the monomer which is consumed at the slowest rate. Uniformity of the composition of the copolymer is promoted by uniformity of the conditions under which the copolymerization is carried out. In view of this it is recommended that the absolute concentrations of the monomers be also kept constant, i. e., all of the monomers are added at the rate at which they are consumed. The greatest uniformity of the conditions under which copolymerization proceeds is obtained in a continuous process whereby copolymerization takes place in a space, kept permanently homogeneous by stirring, from which the copolymer is drained at the rate at which it is formed and in which the feed of monomers and other substances which play a part in the copolymerization exactly compensate for the consumption and drainage of monomers and the said other substances.

The copolymers of the invention may be polymerized in bulk, solvent solution, or in an aqueous emulsion or suspension system. If an aqueous emulsion method is selected various emulsifying agents may be employed, such as soaps like sodium and/or potassium myristate, laurate, palmitate, oleate, stearate, rosinate and/or hydroabietate, or alkali metal alkyl or alkylene sulfates or sulfonates. Ordinarily, about 2% to 5% of the emulsifying agents or mixtures thereof in the aqueous phase are suitable.

Catalysts that may be used in the polymerization may be exemplified by benzoyl peroxide, lauroyl peroxide, tertiary butyl hydroperoxide, 2,2,-di(tertiary butyl peroxy) butane, di(tertiary butyl) peroxide, tertiary butyl perlargonate, hydrogen peroxide, sodium or potassium persulfate, percarbonate, perborate, and peracetic acid, and the like. The amount of the catalyst added may vary over a considerable range. In general, the amount of the catalyst added will vary from 0.1% to 5% by weight of the material being polymerized. Preferred amounts vary from 1% to 2% by weight. If desired, air may be dispersed to act as a catalyst.

The temperature employed in the polymerization may vary over a considerable range depending upon the material being polymerized, catalyst selected, etc. In most cases, the temperature employed will vary from 65° C. to about 300° C. Preferred temperatures range from 100° C. to 250° C. If the temperature is to be used as a factor in keeping the molecular weight low, the preferred temperature will generally vary between 175° C. and 300° C.

The polymerization may be conducted in the presence or absence of air. In most cases, however, it has been found desirable to conduct the polymerization in the absence of air, e. g., in the presence of an inert gas such as nitrogen. Atmospheric, reduced or superatmospheric pressures may be employed.

At the end of the polymerization, the unreacted monomer and preferably any lower fraction of the polymeric material such as that having a boiling point below about 190° C. at 1 mm. pressure are removed from the reaction mixture by any suitable means, such as distillation, etc.

The novel copolymers of the invention possess many unique properties which make them particularly useful and valuable in industry. They may be used, for example, as lubricants or additives for lubricating compositions, asphalt adhesive agents, water-proofing agents for inorganic gel greases, thickening agents or viscosity index improvers. They are particularly valuable as plasticizers for organic resinous compositions, such as the cellulose derivatives, the casein and other protein plastics, lignin plastics, synthetic linear polyamides, phenol-aldehyde-type resins, urea-aldehyde-type resins, and the like.

The novel copolymers of the invention, and particularly those prepared from the unsaturated esters and the aforedescribed special group of compounds, are outstanding plasticizers for thermoplastic vinyl-type polymers. Vinyl-type polymers that may be plasticized with the above-described copolymers include the polymers of the vinyl monomers containing a $CH_2=C=$ group. Examples of such monomers are styrene, alpha-methylstyrene, dichlorostyrene, vinyl naphthalene, methyl acrylate, methyl methacrylate, vinylidene chloride, vinyl chloride, acrylonitrile, methacrylonitrile, vinyl acetate, vinyl chloroacetate, vinyl benzoate, vinyl valerate, and vinyl caproate.

Particularly preferred polymers to be plasticized with the novel copolymers are the vinyl halide polymers. The expression "vinyl halide polymer" as used throughout the specification and claims refers to polymers containing a predominant quantity, e. g., at least 60% by weight, of a vinyl halide, such as vinyl chloride, vinyl bromide, and the like.

A single member of the above-described group of copolymers may be used as the plasticizer or a mixture of two or more of the said copolymers may be utilized. In addition, these copolymers may be used in combination with other plasticizers, such as dioctyl phthalate, dibutyl phthalate, tricresyl phosphate, and the like.

The amount of the plasticizer to be incorporated with the above-described vinyl polymers may vary over a considerable range depending upon the particular type of polymer to be plasticized, the intended use of the compounded resins, etc. In most cases, the amount of the plasticizer will vary from about 20 to 150 parts by weight for every 100 parts by weight of polymer. A more preferred range comprises 40 parts to 75 parts by weight of plasticizer for every 100 parts by weight of resin.

Fillers and pigments, such as whiting, channel black, clay, gum rosin, silica and others, and stabilizers, such as litharge, some oxides of bismuth and barium types, and some silicates may also be added to the polymer along with the novel copolymers of the invention.

The polymer and plasticizer may be compounded together by means of conventional equipment such as mills of the heated roll type or internal mixers. The plasticizer and other compounding ingredients, such as fillers and stabilizers, are worked into the vinyl polymer so that they are thoroughly dispersed therein by means of such equipment, and the resultant composition then molded, extruded or otherwise formed into articles of the desired shape by conventional procedure.

To illustrate the manner in which the invention may be carried out, the following examples are given. Unless otherwise specified, parts disclosed in the examples are parts by weight.

Example I

Allyl ethyl oxalate and 1-octene were combined in equal molecular quantities with 1% by weight of ditertiary butyl peroxide. This mixture was heated at 200° C. for four hours in a sealed glass tube. The tube was then opened and the unpolymerized monomer and a lower fraction of the low molecular weight copolymer having a boiling point below about 200° C. at 1 mm. pressure were removed by distillation. The residue that remained (about 13% of the original mixture) was a liquid copolymer having a relatively homogeneous composition and a molecular weight of about 800.

About 60 parts of the copolymer produced above was combined with 100 parts of poly(vinyl chloride) and the mixture milled and rolled at 160° C. This mixture was easily worked together under these conditions and the resulting sheet had excellent flexibility and strength and lost little if any plasticizer through volatilization and migration. Some of the physical properties of the sheet are indicated below:

Tensile strength_____(25° C.) kg./sq. cm__ 185
Brittle point °C_____ —20

Example II

Allyl 2-acetoxypropionate (allyl acetyllactate) and 1-octene were combined in equal parts by weight with 1% by weight of ditertiary butyl peroxide. This mixture was heated at 200° C. in a sealed tube for four hours. The tube was then opened and the remaining monomer and a lower fraction of the low molecular weight copolymer having a boiling point below about 200° C. at 1 mm. pressure were removed. The residue that remained (about 19.5% of the original charge) was a liquid copolymer having a relatively homogeneous composition and a molecular weight below about 1000.

About 60 parts of the residue copolymer produced above was combined with 100 parts of poly(vinyl chloride) and the mixture milled and rolled at 160° C. This mixture was easily worked together under these conditions and the resulting sheet had excellent flexibility and strength and low volatility.

Example III

Allyl acetoxyacetate (allyl acetylglycolate) and 1-octene were combined in equal parts by weight with 1% by weight of ditertiary butyl peroxide. This mixture was heated at 200° C. in a sealed tube for four hours. The tube was then opened and the remaining monomer and a lower fraction of the low molecular weight copolymer having a boiling point below about 200° C. at 1 mm. pressure was removed by distillation. The residue that remained (about 15.5% of the original mixture) was a liquid copolymer having a relatively homogeneous composition and a molecular weight below about 1000.

The low molecular weight copolymer produced above was easily worked up with poly(vinyl chloride) in a ratio of 60:100. The resulting sheet was flexible and had good strength.

Copolymers having similar plasticizing properties are obtained by substituting each of the following unsaturated esters for the allyl acetoxyacetate in the above-described process: methallyl 3-acetoxybutyrate, 2-butenyl 3-acetoxypentanoate, and allyl 3-butyroxyhexanoate.

Example IV

Allyl ethyl oxalate and 1-octene are combined in equal molecular quantities and the resulting mixture combined with an equal weight of methyl ethyl ketone. About 1% by weight of ditertiary butyl peroxide is then added to this mixture and the combined mixture heated at 200° C. in a sealed tube for four hours. The tubes are then opened and the remaining monomer, methyl ethyl ketone and a lower fraction of the low molecular weight copolymer having a boiling point below about 190° C. at 1 mm. pressure are removed by distillation. The residue that remains is a liquid copolymer having a relatively homogeneous composition and a molecular weight below about 1000.

The copolymer produced above is combined with poly(vinyl chloride) in the weight ratio of 60:100 and with 0.15% ducine and the resulting composition milled and rolled at 160° C. The finished sheets have good flexibility even at the lower temperatures and improved strength and heat stability.

Copolymers having related properties may be obtained by employing the necessary amounts of each of the following ketones in place of methyl ethyl ketone in the above-described process: methyl isobutyl ketone, acetone, dibutyl ketone, and diethyl ketone.

Example V

Technical nonene made up of about 6.5% $C_8$, 74.5% $C_9$ and 19% $C_{10}$ hydrocarbons and allyl methyl succinate are combined in equal molecular quantities. About 100 parts of this mixture is then combined with 100 parts of cumene and 1% by weight of monomer of ditertiary butyl peroxide and the resulting mixture heated at 200° C. for several hours. The tube is then opened and the unreacted monomer, cumene and lower fraction of the copolymer having a boiling point below about 200° C. is removed by distillation. The resulting residue is a viscous liquid copolymer having a relatively homogeneous composition and a molecular weight below about 1000.

A plasticized sheet of poly(vinyl chloride) containing the above-described copolymer in a ratio of 60:100 has the same superior properties as those described in the preceding examples.

Example VI

Copolymers having related properties may be obtained by replacing allyl methyl succinate in the above-described process with equivalent quantities of each of the following unsaturated esters: allyl butyl malonate, vinyl butyl adipate and chloroallyl hexyl oxalate.

About 100 parts of a mixture of methallyl chloride and allyl butyl succinate combined in a molecular ratio of 60:40 are mixed with 1% ditertiary butyl peroxide and 50 parts of triphenylmethane and the resulting mixture heated at 200° C. for several hours. After about 20% of the monomer has been converted, the reaction is stopped and the unconverted monomer and triphenylmethane are removed. The resulting copolymer is a viscous liquid having a molecular weight below about 1000.

About 60 parts of the copolymer produced above is mixed with 100 parts of a copolymer of vinyl chloride and vinyl acetate and the resulting mixture milled at 160° C. The resulting plasticized sheet has good flexibility and strength.

We claim as our invention:

1. A normally liquid low molecular weight relatively homogeneous copolymer of (1) a liquid unsaturated ester of the group consisting of (a) esters of alkanedioic acids containing from 2 to 10 carbon atoms wherein one of the carboxyl groups is esterified with a beta,gamma ethylenically unsaturated monohydric aliphatic alcohol and the other carboxyl group is esterified with an alkanol, and (b) esters of hydroxy-substituted alkanoic acids containing from 2 to 8 carbon atoms wherein the carboxyl group is esterified with a beta,gamma ethylenically unsaturated monohydric alcohol and the hydroxyl group is esterified with a saturated aliphatic monocarboxylic acid, and (2) a dissimilar monomer consisting of an alkene containing from 6 to 18 carbon atoms, said copolymer having a molecular weight below about 3000, an average of 5 to 14 carbon atoms per

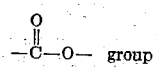

a majority of its macromolecules made up of the said unsaturated ester and the dissimilar unsaturated compound in substantially the same ratio, and a portion of its macromolecules terminated by a molecule of a chain transfer agent which is free of polymerizable carbon-to-carbon linkages and is a member of the group consisting of saturated aliphatic ketones, saturated aliphatic alkdehydes and saturated aliphatic hydrocarbons substituted with at least one aromatic hydrocarbon radical.

2. A relatively homogeneous copolymer of (1) a liquid unsaturated ester of the group consisting of (a) esters of alkanedioic acids containing from 2 to 10 carbon atoms wherein one of the carboxyl groups is esterified with a beta,gamma ethylenically unsaturated monohydric aliphatic alcohol and the other carboxyl group is esterified with an alkanol, and (b) esters of hydroxy-substituted alkanoic acids containing from 2 to 8 carbon atoms wherein the carboxyl group is esterified with a beta,gamma ethylenically unsaturated monohydric alcohol and the hydroxyl group is esterified with a saturated aliphatic monocarboxylic acid, and (2) a dissimilar monomer consisting of an alkene having from 6 to 18 carbon atoms, said copolymer having a molecular weight between 300 and 1000, an average of 5 to 14 carbon atoms per

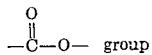

and a majority of its macromolecules made up of the said unsaturated ester and the dissimilar monomer in substantially the same ratio.

3. The copolymer as defined in claim 2 wherein the unsaturated ester is allyl ethyl oxalate and the alkene is 1-octene.

4. The copolymer as defined in claim 2 wherein the unsaturated ester is allyl acetoxyacetate and the alkene is 1-octene.

5. A process for producing a low molecular weight relatively homogeneous copolymer of a liquid unsaturated ester of the group consisting of (1) esters of alkanedioic acids containing from 2 to 10 carbon atoms wherein one of the carboxyl groups is esterified with a beta,gamma ethylenically unsaturated monohydric aliphatic alcohol and the other carboxyl group is esterified with an alkanol, and (2) esters of hydroxy-substituted alkanoic acids containing from 2 to 8 carbon atoms wherein the carboxyl group is esterified with a beta,-gamma ethylenically unsaturated monohydric alcohol and the hydroxyl group is esterified with a saturated aliphatic monocarboxylic acid, and a dissimilar monomer consisting of an alkene containing from 6 to 18 carbon atoms, which comprises heating at a polymerizing temperature a mixture containing the said unsaturated ester and dissimilar monomer, a peroxide polymerization catalyst, and 10% to 200% by weight of the monomers of a chain transfer agent which is free of polymerizable carbon-to-carbon linkages and is a member of the group consisting of saturated aliphatic ketones, saturated aliphatic aldehydes and saturated aliphatic hydrocarbons substituted with at least one aromatic hydrocarbon radical, and while maintaining the concentration of the monomers in the reaction mixture during copolymerization substantially at any time and substantially in each part of the reaction mixture within such limits that in practically any interval of time the copolymer contains an average of 5 to 14 carbon atoms for every

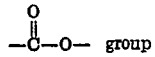

the concentration of catalyst and the temperature employed in the said process being selected so that the resulting copolymers have a molecular weight not in excess of 3000.

6. A process as defined in claim 5 wherein the unsaturated ester is allyl ethyl oxalate, the dissimilar monomer is 1-octene and the chain transfer agent is methyl ethyl ketone.

7. A process as defined in claim 5 wherein the chain transfer agent is cumene.

8. A process for preparing a low molecular weight relatively homogeneous copolymer of a liquid unsaturated ester of the group consisting of (1) esters of alkanedioic acids containing from 2 to 10 carbon atoms wherein one of the carboxyl groups is esterified with a beta,gamma ethylenically unsaturated monohydric aliphatic alcohol and the other carboxyl group is esterified with an alkanol, and (2) esters of hydroxy-substituted alkanoic acids containing from 2 to 8 carbon atoms wherein the carboxyl group is esterified with an ethylenically unsaturated monohydric aliphatic alcohol and the hydroxyl group is esterified with a saturated monocarboxylic acid, and a dissimilar monomer consisting of an alkene having from 6 to 18 carbon atoms, which comprises heating a mixture containing the said unsaturated ester and alkene in the presence of a peroxide polymerization catalyst at a temperature which is sufficiently high to form a copolymer having a molecular weight between 300 and 1000, while maintaining the concentration of the monomers in the reaction mixture during copolymerization substantially at any time and substantially in each part of the reaction mixture within such limits that in practically any interval of time the copolymer contains an average of 5 to 14 aliphatic carbon atoms for every

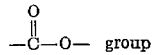

9. A process as defined in claim 8 wherein the unsaturated ester is allyl ethyl oxalate and the alkene is 1-octene.

10. A process as defined in claim 8 wherein the unsaturated ester is allyl acetoxyacetate and the alkene is 1-octene.

11. A process as defined in claim 8 wherein the unsaturated ester is allyl 2-acetoxypropionate and the alkene is 1-octene.

12. A process as defined in claim 8 wherein the unsaturated ester is allyl methyl succinate and the alkene is a technical mixture of octene, nonene and decene.

13. A plasticized composition containing a thermoplastic vinyl halide polymer containing at least 60% by weight of the vinyl halide and as a plasticizer therefor a liquid low molecular weight copolymer defined in claim 1.

14. A plasticized composition containing a thermoplastic vinyl chloride polymer containing at least 60% by weight of vinyl chloride and as a plasticizer therefor a liquid low molecular weight copolymer defined in claim 4.

References Cited in the file of this patent

UNITED STATES PATENTS

| | | |
|---|---|---|
| 2,402,484 | Adelson et al. | June 18, 1946 |
| 2,427,640 | Whitehill et al. | Sept. 16, 1947 |
| 2,440,800 | Hanford et al. | May 4, 1948 |
| 2,448,259 | Finch | Aug. 31, 1948 |
| 2,476,922 | Shokal et al. | July 19, 1949 |
| 2,570,788 | Giammaria | Oct. 9, 1951 |